United States Patent Office 2,979,691
Patented Apr. 11, 1961

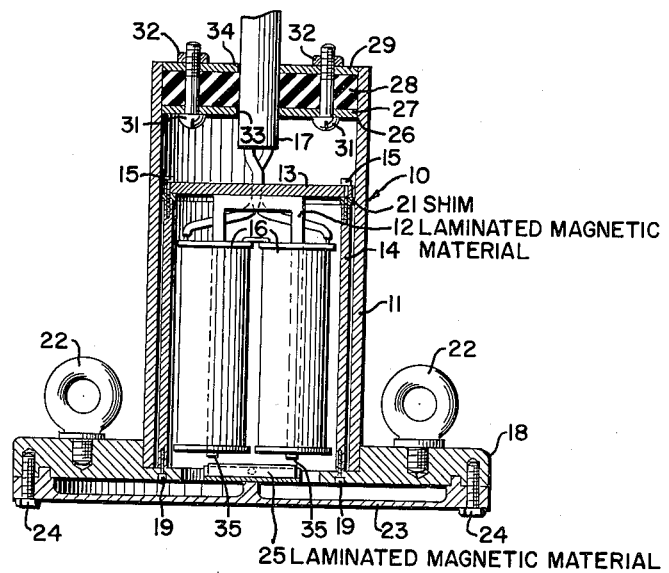

2,979,691

MICROPHONE FOR THE MEASUREMENT OF TRANSIENT PRESSURES IN A BODY OF WATER

Joseph F. Keithley, 418 Rittenhouse St. NW., and Matthew L. Sands, 2107 Fort Davis St. SE., both of Washington, D.C.

Original application Mar. 25, 1943, Ser. No. 480,576, now Patent No. 2,715,717, dated Aug. 16, 1955. Divided and this application Aug. 18, 1954, Ser. No. 454,647

1 Claim. (Cl. 340—12)

(Granted under Title 35, U.S. Code (1952), sec. 266)

This invention relates to an apparatus for measuring variations in pressure and more particularly to an apparatus for measuring and analyzing transient pressures in a body of water.

This application is a division of a copending application, Serial No. 480,576, filed March 25, 1943, now Patent No. 2,715,717, issued August 16, 1955.

Variations in pressure below the surface of a body of water are caused by such transient phenomena as sounds, turbulence, waves, tides and seiches, the latter being a term used in defining the oscillation of the surface of a lake, a landlocked sea or an arm of the sea having a restricted entrance, which varies in period from a few minutes to several hours. It is sometimes desirable to study such phenomena which may occur over either short or long periods of time in places which are difficult of access and under conditions which are not likely to be repeated to determine whether or not they act in concert or in opposition and the manner in which they modify each other.

In attempting to measure these phenomena, difficulties are caused by the fact that each of them has a frequency and an amplitude which varies from the frequency and amplitude of each of the other phenomena so that in designing an apparatus for the measurement thereof, it has been found difficult to produce one which will simultaneously respond to both low frequencies and high frequencies of varying amplitudes with equal accuracy and facility. Another difficulty arises from the fact that in devices in which a microphone is used to measure transient pressure phenomena at various depths in a body of water, it is found that the microphone does not have a linear response and a constant sensitivity at different depths due to the fact that the diaphragm of the microphone changes its flexibility with changes in pressure thereon. For instance, as the pressure increases on a microphone diaphragm the flexibility of the diaphragm decreases and, conversely, as the pressure on the diaphragm decreases the flexibility increases. Where it is desired to measure pressures throughout a range of depths, this leads to inaccuracies in the results as it is difficult to correlate the results produced at one depth with those produced at another depth.

In making measurements of subsurface pressure phenomena, the variations therein are of a transient nature so that it is impossible to analyze them into their various components on the spot. While a recorded trace may be made by means of a recording instrument and the trace subjected to future leisurely study, it is not in a form which may readily be analyzed to determine the component frequencies thereof and the magnitudes of the pressures at the respective frequencies.

One of the objects of the present invention is the provision of a new and improved apparatus for analyzing transient pressures in a body of water in which the foregoing difficulties are obviated and which is adapted to perform all the functions of the devices heretofore proposed or now in general use.

Another object of this invention is to provide a novel microphone for measuring subsurface pressures in a body of water which microphone will have a substantially constant percentage change of inductance with respect to the measured pressure throughout a predetermined depth range in which measurements are to be made.

Another object of the invention is to provide a novel method of adjusting a microphone to be employed in measuring subsurface pressures in a body of water so that said microphone will have a substantially constant percentage change of inductance with respect to the measured pressure throughout a predetermined depth range in which measurements are to be made.

In general, in an apparatus of the character comprising the present invention, a novel watertight microphone, adjusted to give a substantially linear response and a constant sensitivity for the particular range of depths at which measurements are to be made, is adapted to be submerged in a body of water, the output of the microphone preferably being connected to a network which converts the signal into a form which is readily recordable on a phonograph record.

More specifically, the present invention provides a system wherein a microphone adapted for underwater use is submerged below the surface of a body of water at depths through which desired measurements are to be made. The microphone comprises a casing having therein a flexible diaphragm which carries an armature which cooperates with a U shaped core having a coil on each leg thereof. The microphone is provided with a novel feature in that the diaphragm and the core are adjustable with respect to one another so that for a particular range of depths in which measurements are to be made, the diaphragm may be adjusted with respect to the core to produce, with change in pressure on the diaphragm, a linear response in the change of inductance of the windings on the core when these windings are supplied with alternating current.

That this result is obtained is evident from the following explanation. It will be noted, as pointed out above, that the flexibility of the diaphragm changes with the change in pressure thereon. The rate of change of inductance of the windings on the core also changes as the armature attached to the diaphragm changes its distance from the core with change in pressure. However, when the microphone is submerged and the flexibility of the diaphragm decreases with increase in pressure, the armature carried by the diaphragm is forced by the increased pressure to reduce the gap between it and the core and, therefore, to increase the rate of change of inductance of the coils carried by the core. By proper adjustment of the initial gap between the armature and the core, it is possible for one of these factors to compensate for the change in the other factor substantially throughout a particular range of depths in which measurements are to be made.

The microphone of the present invention is particularly well suited for studying signals for all frequencies up to a desired value so as to determine the effects of sound, turbulence, waves, tides and seiches at different frequencies.

Still other objects, advantages and improvements will become apparent from the following detailed description taken in connection with the accompanying drawing in which:

The single figure of the drawing is a sectional view of a microphone according to a preferred form of the invention.

In the single figure of the drawing there is shown thereon a microphone unit designated generally by the numeral 10 and illustrated in detail.

The microphone unit 10 comprises a casing 11 made of a non-magnetic metal preferably of a non-corrodable material such as brass or the like. This casing encloses a laminated U-shaped member 12 made of a highly permeable magnetic material such as the material known as Permalloy in the trade. The U-shaped member 12 is attached to a disc 13 preferably formed of a non-magnetic material, the disc and U-shaped member being fastened together by any well known means. The disc 13 is attached to a cylinder 14 by cap screws 15, the cylinder also being formed of a non-magnetic material.

Surrounding each leg or core of the U-shaped member 12 is a coil 16, the two coils being connected in series to a cable 17. The casing 11 is permanently attached to an annular member 18 which supports the cylinder 14 and which is attached thereto by cap screws 19. Between the cylinder 14 and the disc 13 is placed a shim 21 for a purpose which will be described hereinafter. The annular member 18 is provided with eye bolts 22 to which lowering cables may be attached for the purpose of submerging the microphone in a body of water. Clamped to the annular member 18 is a diaphragm 23, the diaphragm being held in place by bolts 24, the diaphragm 23 being lapped to the annular member 18 for the purpose of preventing leakage of water into the interior of the casing 11. The diaphragm 23 carries a laminated armature 25 in alignment with the pole faces of the U-shaped member or core 12 and equidistantly spaced therefrom and which is made of a highly permeable magnetic material such as Permalloy.

At the upper end of the casing 11, an internal shoulder 26 is provided. A disc 27 rests on said shoulder and is arranged to support a cylindrical body 28 of elastic material such as soft rubber. A disc 29 similar to the disc 39 rests upon the elastic material, the two discs being forced toward each other by means of bolts 31 and nuts 32. The discs 27 and 29 are provided with apertures 33 and 44 respectively through which pass the cable 17, the elastic material also being provided with an aperture in alignment with the apertures 33 and 34. This arrangement provides a watertight seal for the upper end of the casing 11 as tightening of the nuts 32 will force the elastic material between the discs 27 and 29 into close engagement with the walls of the casing 11 and with the cable 17.

Referring to the single figure on the drawing, the arrangement shown therein is carried to a location on a body of water at which the desired measurements are to be made. The microphone unit 10 is submerged in the water to the desired depth by means of the eye bolts 22 and cables (not shown), the conducting cable 17 being unreeled a sufficient amount to permit this. Prior to submergence of the microphone, a shim 21 of the proper thickness is placed within the microphone, as illustrated on the drawing, so as to space the armature 25 equidistantly from the pole faces 35 of the U-shaped member 12 a distance which will render linear the response of the microphone at the particular range of depths through which measurements are to be made as explained hereinabove.

Briefly stated in summary, the present invention contemplates the provision of a new and improved apparatus for analyzing transient pressures in a body of water which is suitable for use with means adapted to record accurately all of such pressures in a form which may easily be analyzed at leisure and which may be studied minutely at all desired frequencies without the necessity of repeating the measurements.

While the invention has been described in detail with respect to a certain preferred example thereof which gives satisfactory results, it will be understood by those skilled in the art, after understanding the invention, that various features of the system disclosed and claimed herein may advantageously be employed in types of sound or pressure recording systems other than that disclosed and that various modifications and changes may be made without departing from the spirit and scope of the invention, and it is intended, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

A microphone for use under water for measuring pressure at various depths as an alternating current is applied thereto, in combination, an annular member having a plurality of eye bolts secured thereto for supporting the member at a depth of submergence within the water, a circular diaphragm secured to said member in coaxial and watertight relation therewith and having a lobe at a central portion of the inner face thereof and formed integrally therewith, a laminated armature attached to said lobe and movable therewith, a laminated U-shaped core having a pair of coplanar pole faces thereon, a pair of coils carried by said U-shaped core on the legs thereof, an electric cable having a pair of conductors therein connected to said coils for establishing an external electrical connection thereto, means including a casing carried by said annular member for establishing a watertight seal with said cable, a hollow rigid cylindrical member disposed within said casing and secured to said annular member, said cylindrical member enclosing but not in contact with said coils, a circular plate having a diameter equal to the outside diameter of said cylindrical member to which said U-shaped core is secured at a medial portion thereof for supporting said U-shaped core such that the armature is continuously aligned with said pole faces and in closely spaced equidistant relation therewith, said circular plate having a plurality of apertures therein, a plurality of screws disposed respectively within said apertures and threaded into said cylindrical member for clamping the plate to the cylindrical member, and an annular shim clamped between the adjacent clamping surfaces of said plate and cylinder for setting at will the initial spaced relation of the armature with respect to said pole faces without changing the aligned relation of the armature therewith in accordance with the thickness of said shim.

References Cited in the file of this patent

UNITED STATES PATENTS

| | | |
|---|---|---|
| 1,375,707 | King | Apr. 26, 1921 |
| 1,522,289 | Cover | Jan. 6, 1925 |
| 1,523,540 | Hecht | Jan. 20, 1925 |
| 1,571,454 | Morrison | Feb. 2, 1926 |
| 1,587,828 | Gernsback | June 8, 1926 |
| 1,677,945 | Williams | July 24, 1928 |
| 1,940,553 | Lieber | Dec. 19, 1933 |
| 2,346,429 | Harrison | Apr. 11, 1944 |
| 2,410,805 | Black | Nov. 12, 1946 |
| 2,505,519 | Beranek | Apr. 25, 1950 |